(12) United States Patent
Chang et al.

(10) Patent No.: US 7,949,012 B2
(45) Date of Patent: May 24, 2011

(54) HIGH-SPEED UPLINK PACKET ACCESS (HSUPA) CIPHER MULTIPLEXING ENGINE

(75) Inventors: Li Fung Chang, Holmdel, NJ (US); Andrew Du Preez, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 902 days.

(21) Appl. No.: 11/861,700

(22) Filed: Sep. 26, 2007

(65) Prior Publication Data
US 2009/0034507 A1  Feb. 5, 2009

Related U.S. Application Data

(60) Provisional application No. 60/953,317, filed on Aug. 1, 2007.

(51) Int. Cl.
*H04J 3/24* (2006.01)
(52) U.S. Cl. ......... 370/474; 370/409; 370/349; 455/403
(58) Field of Classification Search .................. 370/349, 370/409, 449, 338, 208, 331, 474, 476, 310, 370/270; 455/424, 560, 403
See application file for complete search history.

(56) References Cited

U.S. PATENT DOCUMENTS

| | | | | |
|---|---|---|---|---|
| 7,130,295 B2* | 10/2006 | Kim et al. | ...................... | 370/349 |
| 7,154,873 B2* | 12/2006 | Yi | ................................. | 370/338 |
| 7,577,779 B2* | 8/2009 | Hayem et al. | ................. | 710/110 |
| 7,668,188 B2* | 2/2010 | Chang et al. | ................... | 370/415 |
| 7,760,634 B2* | 7/2010 | Yi | ................................. | 370/231 |
| 7,839,894 B2* | 11/2010 | Yi | ................................. | 370/474 |
| 2002/0042270 A1* | 4/2002 | Yi | ................................. | 455/424 |
| 2003/0007480 A1* | 1/2003 | Kim et al. | ..................... | 370/349 |
| 2006/0251105 A1* | 11/2006 | Kim et al. | ..................... | 370/449 |
| 2007/0014229 A1* | 1/2007 | Hepler et al. | ................. | 370/208 |
| 2007/0081513 A1* | 4/2007 | Torsner | ......................... | 370/349 |

(Continued)

OTHER PUBLICATIONS

Peisa et al..; High Speed Packet Access Evolution—Concept and Technologies; Vehicular Technology Conference, 2007. VTC2007-Spring. IEEE 65th Issue Date: Apr. 22-25, 2007.*

(Continued)

*Primary Examiner* — Salman Ahmed
(74) *Attorney, Agent, or Firm* — Garlick Harrison & Markison; Bruce E. Garlick

(57) ABSTRACT

A combined data packing, cipher and multiplexing engine operable to support high speed uplink packet access (HS-UPA) within user equipment (UE) is provided. This combined cipher multiplexing engine includes a master port, a radio link control (RLC) data packer, and a cipher multiplexing processing module. The master port couples to an advanced microprocessor bus architecture (AMBA) high speed buss (AHB) on which control information for the combined cipher and multiplexing engine is provided. The RLC couples to the master port and receives RLC service data units (SDUs) from the AHB. Then the RLC data packer may concatenate or segment RLC SDUs into RLC packet data units (PDUs) which are stored for use by a cipher multiplexing processing module. The cipher multiplexing processing module retrieves the RLC PDU from the RLC PDU buffer and ciphers to produce ciphered data, if cipher is enabled and multiplexes the ciphered/non-ciphered data together with the RLC header, MAC-es header, MAC-e header and enters the multiplexed results to a hybrid automatic repeat request (HARQ) buffer. A protocol stack executed within the UE activates and provides an array on the formation of the RLC PDU, RLC header information to the combined cipher and multiplexing engine for RLC PDU ciphering and medium access control (MAC) multiplexing of the enhanced data transport channel (E-DCH).

22 Claims, 12 Drawing Sheets

U.S. PATENT DOCUMENTS

| | | | |
|---|---|---|---|
| 2007/0297369 A1* | 12/2007 | Jiang et al. | 370/331 |
| 2008/0037588 A1* | 2/2008 | Yi | 370/474 |
| 2008/0064444 A1* | 3/2008 | Yi | 455/560 |
| 2008/0219195 A1* | 9/2008 | Pani et al. | 370/310 |
| 2008/0225893 A1* | 9/2008 | Cave et al. | 370/476 |
| 2008/0226074 A1* | 9/2008 | Sammour et al. | 380/270 |
| 2008/0279192 A1* | 11/2008 | Tseng | 370/394 |
| 2009/0022134 A1* | 1/2009 | Chun et al. | 370/342 |
| 2009/0028125 A1* | 1/2009 | Chun et al. | 370/342 |
| 2009/0034487 A1* | 2/2009 | Lohr et al. | 370/335 |
| 2009/0034507 A1* | 2/2009 | Chang et al. | 370/349 |
| 2009/0036061 A1* | 2/2009 | Chun et al. | 455/68 |
| 2009/0046626 A1* | 2/2009 | Shao et al. | 370/320 |
| 2009/0245281 A1* | 10/2009 | Jung et al. | 370/469 |
| 2009/0245282 A1* | 10/2009 | Jung et al. | 370/469 |
| 2010/0118893 A1* | 5/2010 | Lee et al. | 370/474 |
| 2010/0309830 A1* | 12/2010 | Yi | 370/310 |

OTHER PUBLICATIONS

Meyer et al.;ARQ Concept for the UMTS Long-Term Evolution; Vehicular Technology Conference, 2006. VTC-2006 Fall. 2006 IEEE 64th Issue Date: Sep. 25-28, 2006.*

Marinier et al.;System-Level Performance Evaluation of HSDPA/HSUPA with TCP-Based Application; This paper appears in: Vehicular Technology Conference, 2006. VTC-2006 Fall. 2006 IEEE 64th Issue Date: Sep. 25-28, 2006.*

Quality of Packet Services in UMTS and Heterogeneous Networks; Teyeb—2007.*

Effect of multiple simultaneous HSDPA users on HSDPA end-user performance for non-real time services in one cell system; JLP Adán—2006.*

Draft Standard for Local and Metropolitan Area Networks: Media Independent Handover Services IEEE Unapproved Draft Std P802.21/D8.0, Dec. 2007.*

* cited by examiner

HIGH-SPEED UPLINK PACKET ACCESS (HSUPA) CIPHER MULTIPLEXING ENGINE

CROSS-REFERENCE TO RELATED APPLICATIONS/INCORPORATION BY REFERENCE

This application claims priority to U.S. Provisional Patent Application Ser. No. 60/953,317, filed Aug. 1, 2007. The above referenced application is hereby incorporated herein by reference in its entirety.

TECHNICAL FIELD OF THE INVENTION

The present invention relates generally to cellular wireless communication systems, and more particularly to the uplink of data within a wireless terminal of a cellular wireless communication system that supports high speed uplink packet access (HS-UPA).

BACKGROUND OF THE INVENTION

Mobile communication has changed the way people communicate and mobile phones have been transformed from a luxury item to an essential part of every day life. The use of mobile phones today is generally dictated by social situations, rather than being hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

The General Packet Radio Service (GPRS) and Enhanced Data rates for GSM (EDGE) technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths.

High speed downlink packet access (HSDPA) and High speed uplink packet access (HSUPA) technology provide an Internet protocol (IP) based service, oriented for data communications, which adapts WCDMA to support data transfer rates on the order of 10 megabits per second (Mbits/s). Developed by the $3^{rd}$ Generation Partnership Agreement (3GPP), the HSDPA and HSUPA technologies achieve higher data rates through a plurality of methods. For example, within HSDPA many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. These technologies may also utilize variable coding rates.

In 3GPP, these base stations may be referred to as "Node B's" and the wireless terminals may be referred to as user equipment (UE). In operation, each Node B communicates with a plurality of wireless UEs operating in its cell/sectors. A controller coupled to the Node B routes voice, video, data or multimedia communications between the UE and a packet data network that may include or couple to the Internet. Transmissions from base stations to wireless terminals are referred to as "forward link" or "downlink" transmissions while transmissions from wireless terminals to base stations are referred to as "reverse link" or "uplink" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single Node B forces the need to divide the forward and reverse link transmission resources (depending on the specific wireless standards, the resources could be frequency band, time slot, orthogonal code, and transmit power) amongst the various wireless terminals.

In some instances, HSDPA and HSUPA may provide a two-fold or greater improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA and HSUPA are an extension of the GSM family, it also builds directly on the economies of scale offered by the world's most popular mobile technology. Those improvements may directly translate into lower cost-per-bit, faster and more available services, and a network that is positioned to compete more effectively in the data-centric markets of the future.

The capacity, quality and cost/performance advantages of HSDPA and HSUPA yield measurable benefits for network operators, and, in turn, their subscribers. For operators, this backwards-compatible upgrade to current WCDMA networks is a logical and cost-efficient next step in network evolution. When deployed, HSDPA and HSUPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier.

HSUPA and HSDPA make true mass-market mobile IP multimedia possible and while at the same time reducing the cost-per-bit of service delivery, thus boosting both revenue and bottom-line network profits. For data-hungry mobile subscribers, the performance advantages of HSDPA/HSUPA may translate into shorter service response times, less delay and faster perceived connections. Users may also download/upload packet-data over HSDPA/HSUPA while conducting a simultaneous speech call.

However, implementing advanced wireless technologies such as WCDMA and/or HSDPA and HSUPA may still require overcoming some architectural hurdles because of the very high-speed, wide bandwidth data transfers possible. For example, unlike a desktop computer, the processors within the wireless terminal are assigned multiple processing duties. The processing of the data received to determine the need for retransmission takes place at the UE, these processing operations may be very sensitive to processing time. It is therefore important to devise methods that may lead to a minimum processing time for the determination of the need for a fast retransmission of lost packets without placing increasing demands on the processors and capacity of the UE. The addition of processing requirements within the wireless terminal requires new methods with which to balance data processing within the UE's while maintaining service.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE DRAWINGS

Preferred embodiments of the present invention are illustrated in the FIGs., like numerals being used to refer to like and corresponding parts of the various drawings.

Embodiments of the present invention provide a combined data packing, cipher and multiplexing engine operable to support high speed uplink packet access (HS-UPA) within user equipment (UE) is provided. This combined cipher multiplexing engine includes a master port, a radio link control (RLC) data packer, and a cipher multiplexing processing module. The master port couples to advanced microprocessor bus architecture (AMBA) high speed buss (AHB) on which control information for the combined cipher and multiplexing engine is provided. The RLC couples to the master port and receives RLC service data units (SDUs) from the AHB. Then the RLC data packer may concatenate or segment RLC SDUs into RLC packet data units (PDUs) which are stored for use by a cipher multiplexing processing module. The RLC PDUs can be stored in the external memory or cipher multiplexing processing module's internal memory. The cipher multiplexing processing module retrieves the RLC PDU from the RLC PDU buffer in the external memory or from its internal memory and ciphers to produce ciphered data if ciphering is enabled and multiplexes the ciphered/non-ciphered data together with the RLC headers, MAC-e header and stores the resulting PDU to a hybrid automatic repeat request (HARQ) buffer. A protocol stack executed within the UE activates and provides an array on the formation of the RLC PDU, RLC header information to the combined cipher and multiplexing engine for RLC PDU ciphering and medium access control (MAC) of the enhanced dedicated channel (E-DCH), MAC-e operation. Embodiments of the present invention also Allow for the mix of cipher RLC PDUs and non-ciphered RLC PDUs to be multiplexed into one MAC-e PDU (i.e. ciphered engine can operate as a data mover/copier function when cipher is not enabled. There are control messages that are sent by stand-alone RLC PDUs which are not ciphered).

Figure 1:
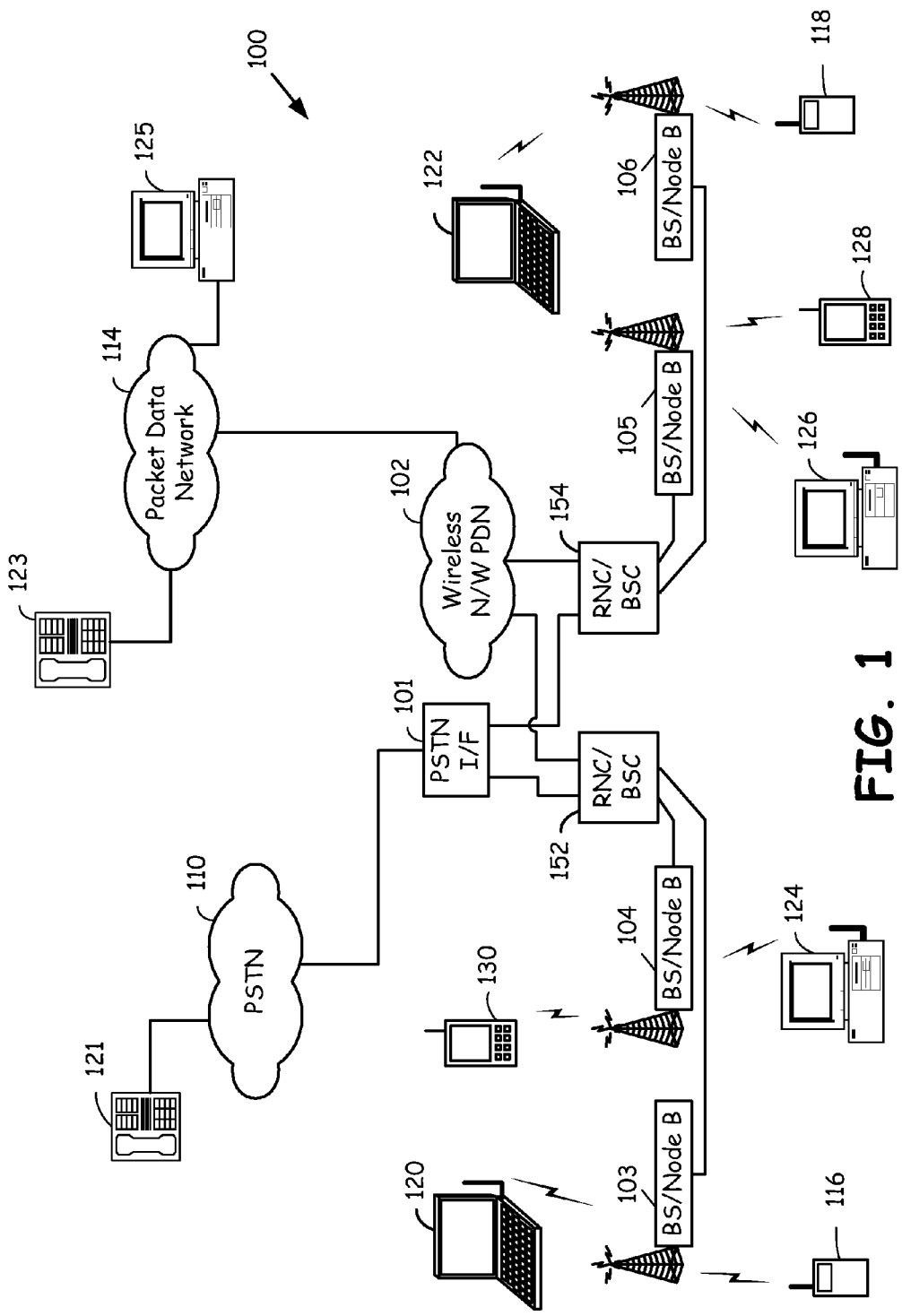
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and base stations/node Bs 103, 104, 105, and 106. The wireless network packet data network 102 couples to additional private and public packet data networks 114, e.g., the Internet, WANs, LANs, etc. A conventional voice terminal 121 couples to the PSTN 110. Voice over Internet Protocol (VoIP) terminal 123 and a personal computer 125 couple to the Internet/WAN 114. The PSTN Interface 101 couples to the PSTN 110. Of course, this particular structure may vary from system to system.

Each of the base stations/node Bs 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc. This communication interface support includes the support of the High Speed Downlink Packet Access (HSDPA) operating standard, E-DCH (i.e. HSUPA), which will be described in detail herein. However, the reader should appreciate that principles and teachings of the present invention apply to other types of wireless interface operations, in addition to HSDPA operations.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard, the GPRS standard, the UMTS/WCDMA standards, HSDPA, HSUPA, other of the GSM standards and/or other wireless interface standards such as, for example, the various families of North American TDMA/FDMA/CDMA standards.

Figure 2:
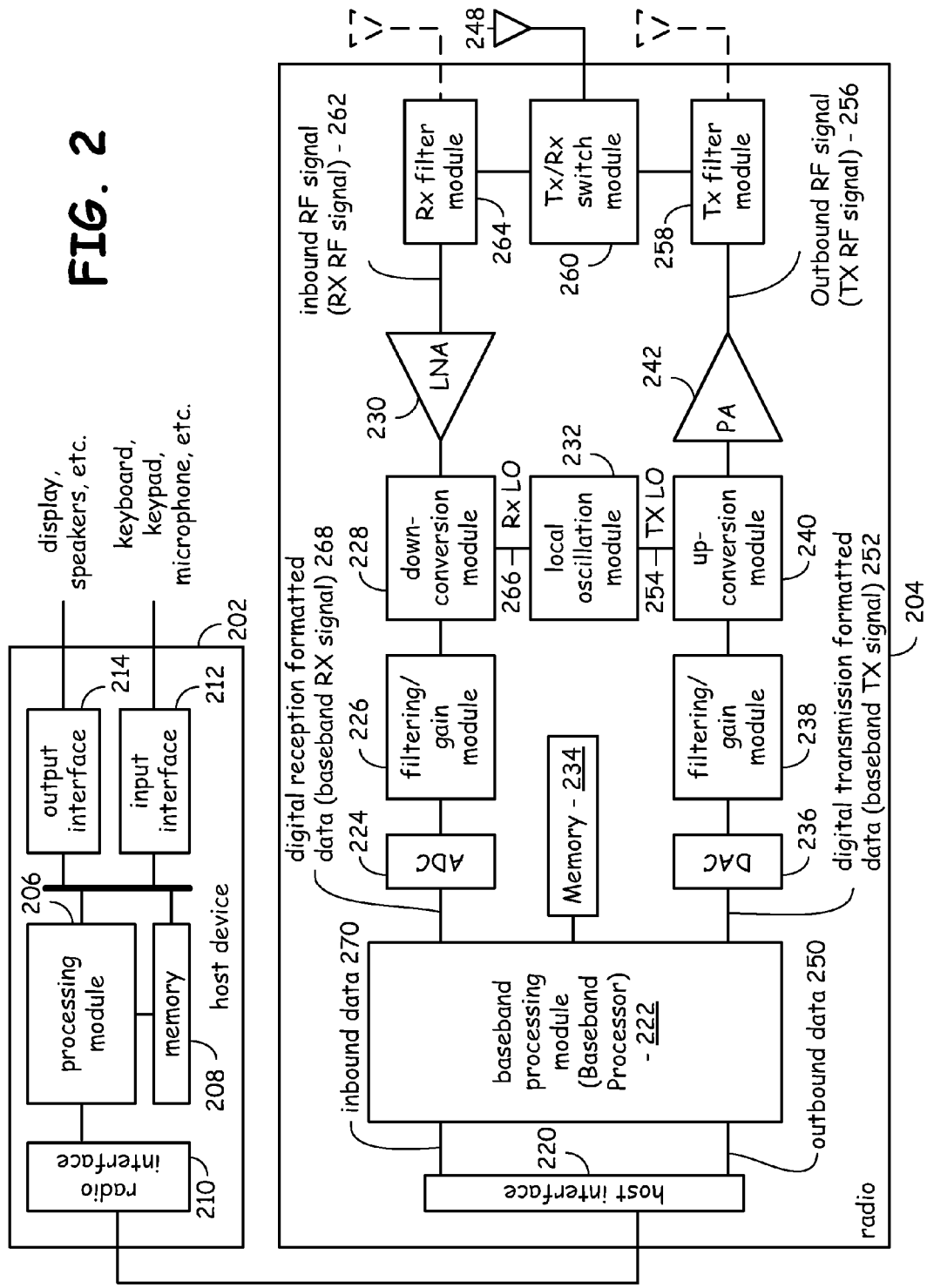
FIG. 2 is a block diagram functionally illustrating a wireless terminal constructed according to the present invention.

FIG. 2 is a schematic block diagram illustrating a wireless terminal that includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card and, therefore, reside be house separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling and/or decoding. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, HSDPA, HSUPA, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives an inbound RF signal 262, which was transmitted by a base station via the antenna 248, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

Figure 3:
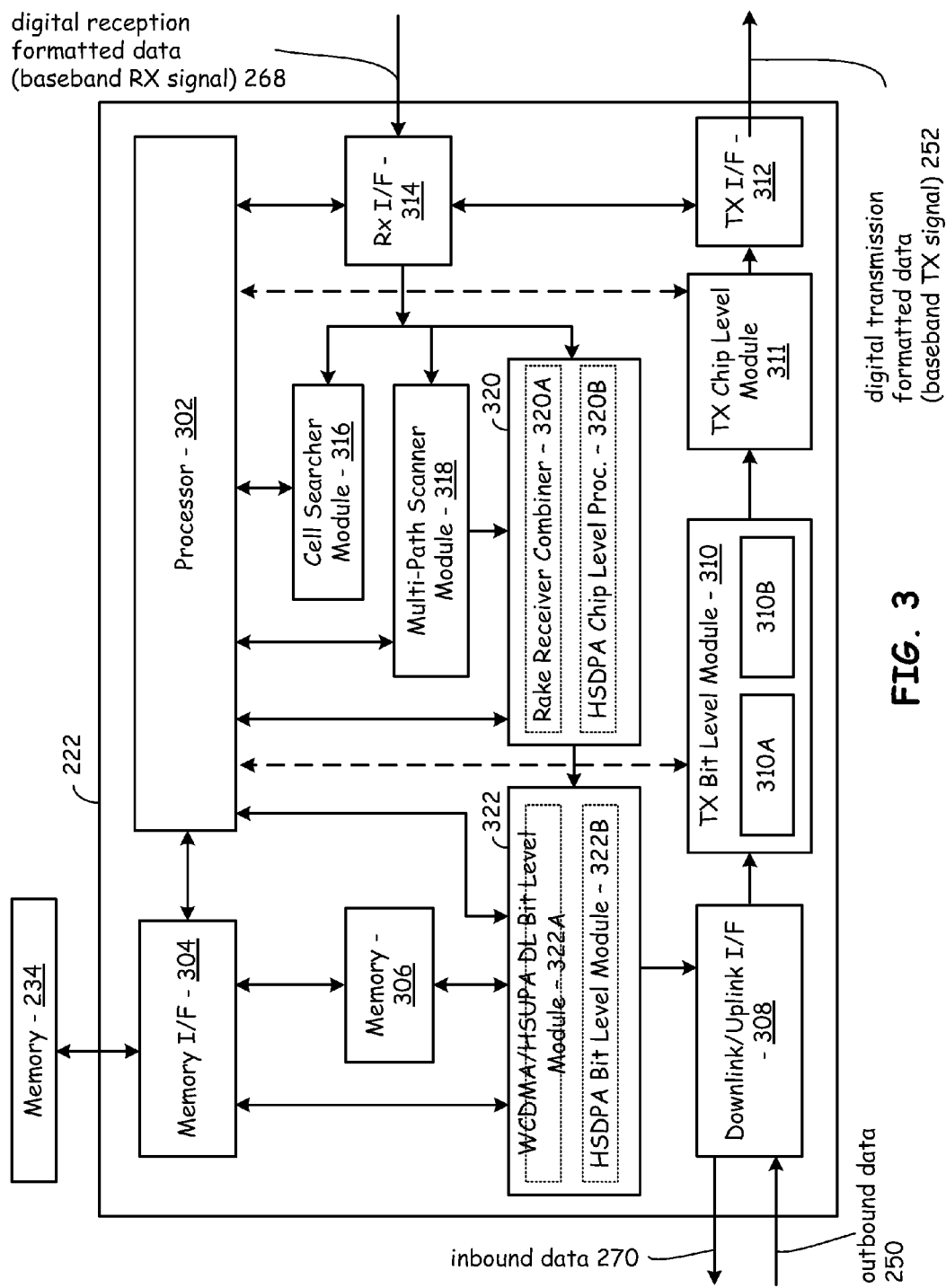
FIG. 3 is a block diagram illustrating components of a baseband processing module according to an embodiment of the present invention.

FIG. 3 is a block diagram illustrating components of a baseband processing module 222 according to an embodiment of the present invention. Components of baseband processing module (baseband processor) 222 include a processor 302, a memory interface 304, onboard memory 306, a downlink/uplink interface 308, TX processing components 310, and a TX interface 312. The baseband processing module 222 further includes an RX interface 314, a cell searcher module 316, a multi-path scanner module 318, a chip level processing module 320, and a bit level processing module 322.

The chip level processing module 320 includes a rake receiver combiner 320A that generally supports WCDMA receive processing operations and HSUPA downlink channel processing operations and a HSDPA chip level processing module 320B that generally, supports HSDPA receive processing operations. The bit level processing module 322 includes a WCDMA/HSUPA bit-level processing module 322A that supports WCDMA bit-level operations and HSUPA downlink channels bit processing and a HSDPA bit-level processing module 322B that supports HSDPA bit-level operations. The Tx processing is split into Tx bit level processing module 310 and chip level processing 311. The bit level processing module 310 includes WCDMA/HSUPA uplink bit level module 310A that supports WCDMA and HSDPA uplink channel bit level processing and an E-DCH bit level processing module 310B. The chip level processing module 311 supports all WCDMA, E-DCH and HSDPA related uplink channel chip processing. The HSUPA outbound data processed by the higher layer residing in the processing module 206 will be discussed in FIGS. 4-12.

The baseband processing module 222 couples in some embodiments to external memory 234. However, in other embodiments, memory 306 fulfills the memory requirements of the baseband processing module 302. According to some aspects of the present invention, memory 306 is cacheable while memory 234 is non-cacheable. Of course, in other embodiments, memory 234 may also be cacheable. As was previously described with reference to FIG. 2, the baseband processing module receives outbound data 250 from coupled host processing components 202 and provides inbound data 270 to the coupled host processing components 202. Further, the baseband processing module 222 provides digital formatted transmission data (baseband TX signal) 252 to a coupled RF front end. The baseband processing module 222 receives digital reception formatted data (baseband RX signal) 268 from the coupled RF front end. As was previously described with reference to FIG. 2, an ADC 222 produces the digital reception formatted data (baseband RX data) 268 while the DAC 236 of the RF front end receives the digital transmission formatted data (baseband TX signal) 252 from the baseband processing module 222.

According to one particular embodiment of the present invention, the downlink/uplink interface 308 is operable to receive the outbound data 250 from coupled host processing components, e.g., the host processing component 202 via host interface 220. Further, the downlink/uplink interface 308 is operable to provide inbound data 270 to the coupled host processing components 202 via the host interface 220. As the reader will appreciate, the baseband processing module 222 may be formed on a single integrated circuit with the other components of radio 204. Further, the radio 204 may be formed in a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, the baseband processing module 222 and the host processing components 202 may be formed on a separate integrated circuit. Many differing integrated circuit constructs are possible without departing from the teachings of the present invention.

TX processing components 310 and TX interface 312 communicatively couple to the RF front end as illustrated in FIG. 2 and to the downlink/uplink interface 308. The TX processing components 310 and TX interface 312 are operable to receive the outbound data from the downlink/uplink interface 304, to process the outbound data to produce the baseband TX signal 252 and to output the baseband TX signal 252 to the RF front end as was described with reference to FIG. 2.

RX processing components including the cell searcher module 316, multi-path scanner module 318, chip level processing module 320, and in some cases the processor 302 are operable to receive the RX baseband signal 268 from the RF front end as processed by the RX I/F 314. Generally, the RX I/F 314 produces soft symbols representing the digital reception formatted data 268 in a format suitable for use by these components. The HSDPA chip level processing module 320B is operable to produce soft symbols output for use by the HSDPA decoding module 322B of the bit level processing module 322. The HSDPA bit level processing module 322B includes Hybrid Automatic Retransmission (HARQ) and IR processing components and Turbo decoding component.

Figure 4:
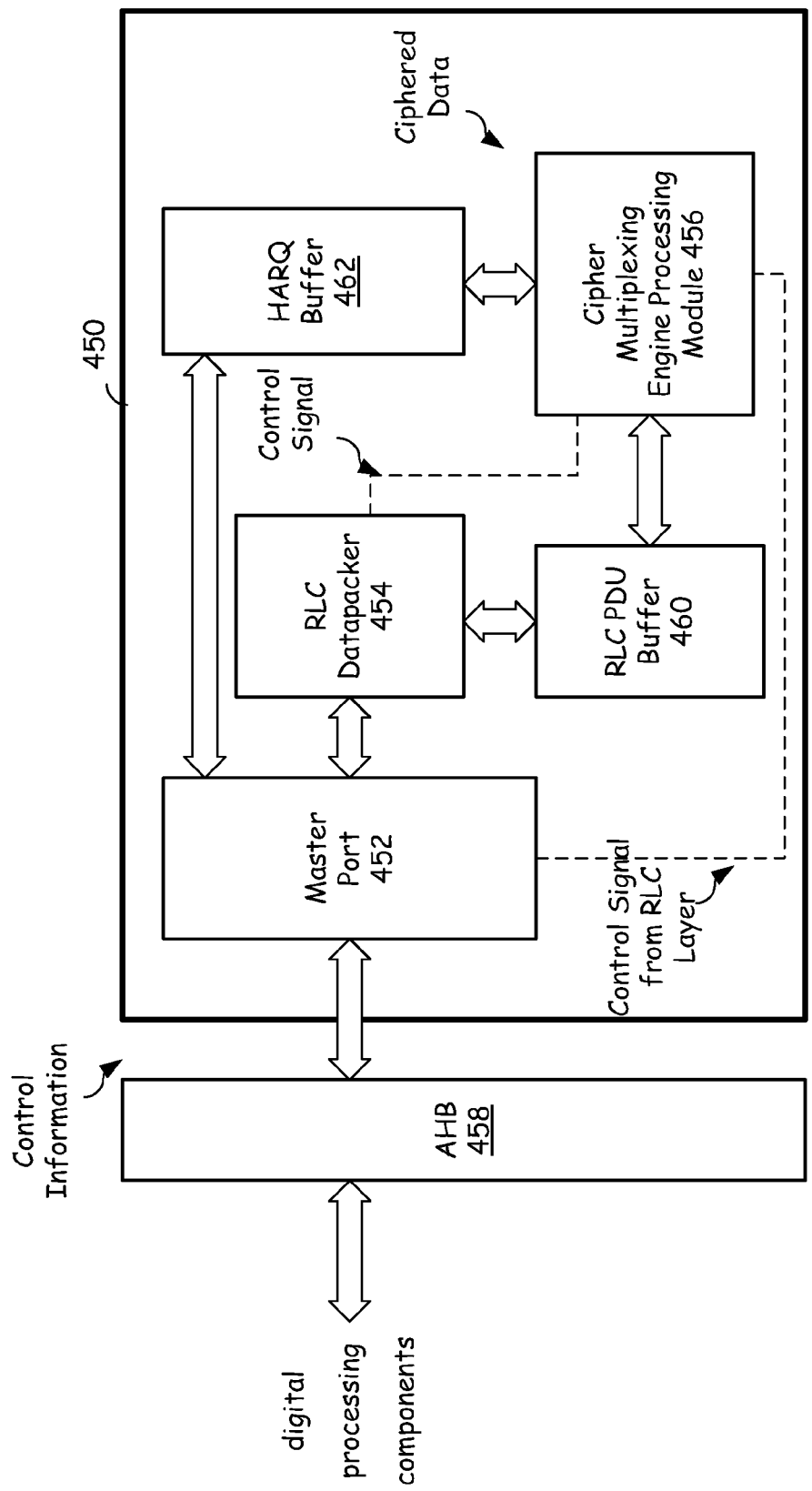
FIG. 4 is a block diagram illustrating an embodiment of a combined cipher and multiplexing engine operable to support high speed uplink packet access (HS-UPA) within user equipment (UE) in accordance with embodiments of the present invention.

FIG. 4 is a block diagram illustrating an embodiment of a combined cipher and multiplexing engine operable to support high speed uplink packet access (HS-UPA) within user equipment (UE) in accordance with embodiments of the present invention. This combined cipher and multiplexing engine 450 may be part of the digital processing components. This combined cipher multiplexing engine includes a master port 452, a radio link control (RLC) data packer 454, and a cipher multiplexing processing module 456. The master port couples to an advanced microprocessor bus architecture (AMBA) high speed bus (AHB) 458 that may connect various components with digital processing components or processing components of DSP. Control information for the combined cipher and multiplexing engine is provided via this AHB. The RLC couples to the master port 452 and receives RLC service data units (SDUs) from the AHB 458. Then the RLC data packer 454 may concatenate or segment RLC SDUs into RLC packet data units (PDUs) which are stored in RLC buffers resided in external or internal memory for use by a cipher multiplexing processing module 456. The cipher multiplexing processing module 456 retrieves the RLC PDU from the RLC PDU buffer and ciphers to produce ciphered data, if ciphering is enabled and multiplexes the ciphered/non-ciphered data together with RLC header, MAC-e header to form a MAC-e PDU. Embodiments of the present invention also allow for ciphered RLC PDUs and non-ciphered RLC PDUs to be multiplexed into one MAC-e PDU (i.e. ciphered engine can operate as a data mover/copier function when cipher is not enabled). The MAC-e PDU is then stored to a hybrid automatic repeat request (HARQ) buffer. The HARQ buffer can be an on-chip memory or an external memory. The protocol stack executed within the UE activates and provides an array on the formation of the RLC PDU, RLC header information to the combined cipher and multiplexing engine for RLC PDU ciphering and medium access control (MAC) multiplexing of the enhanced dedicated channel (E-DCH). The functions of combined cipher and multiplexing engine will be described further with respect to FIG. 5 and following.

Figure 5:
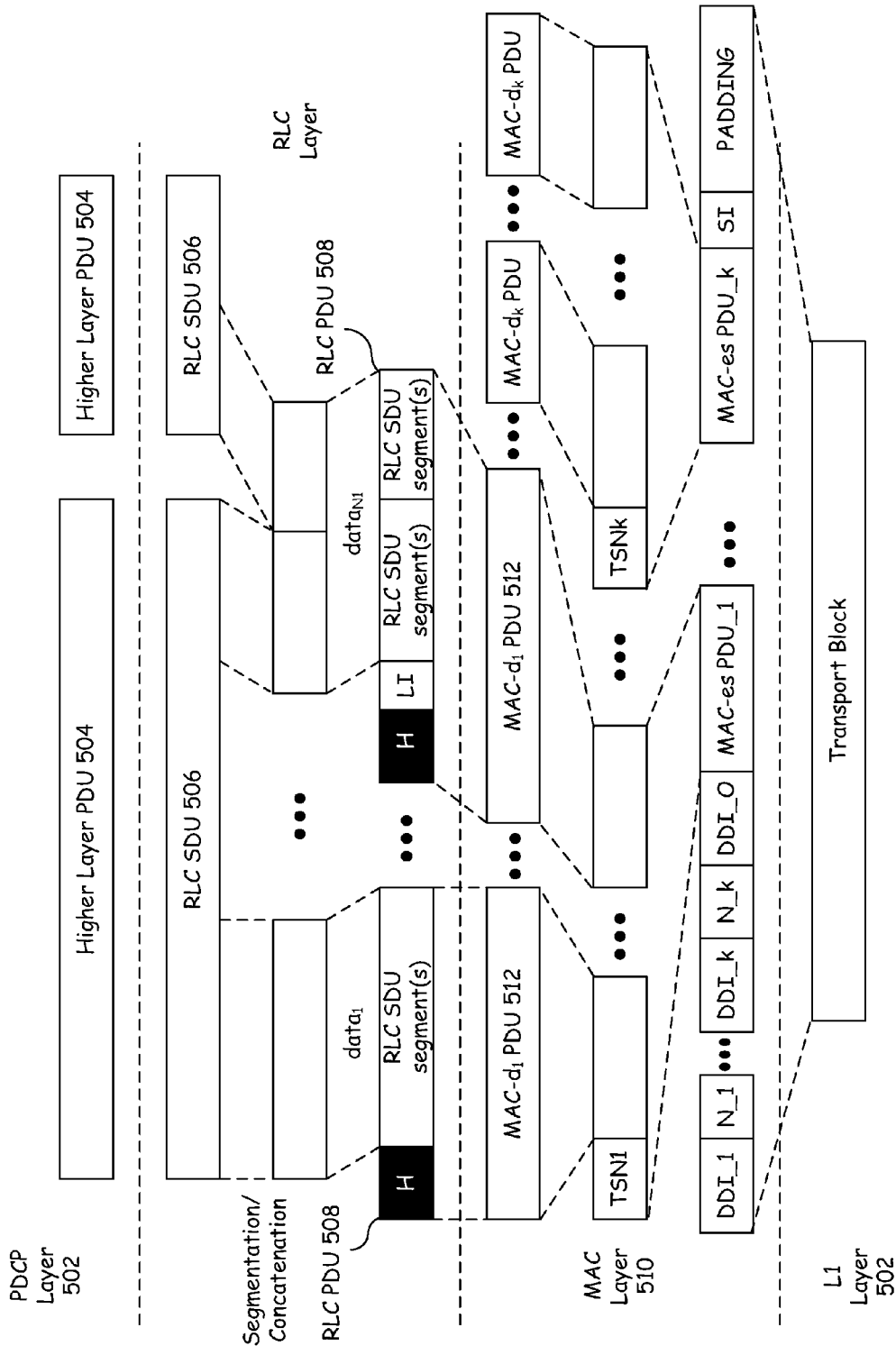
FIG. 5 illustrates data flow through layers in a radio system of a high-speed uplink packet access (HS-UPA) telephony system within a WCDMA network in accordance with embodiments of the present invention.

FIG. 5 illustrates data flow through layers in a radio system of a high-speed uplink packet access (HS-UPA) telephony system within a WCDMA network. Payloads 504 from a higher layer (packet data convergence protocol (PDCP)) 502 are packed into RLC SDUs 506 and stored in RLC buffers. These RLC SDUs 506 may be segmented or concatenated depending on their size. RLC SDU 506 may be segmented into multiple RLC PDUs 508 if the RLC SDU size is larger than that of the RLC PDU size. Similarly multiple RLC SDUs 506 may be assembled into an RLC PDU 508 if the RLC SDU size is smaller than the RLC PDU size. In this case length indicators (LI) may be pre-pended to the payload to distinguish RLC SDUs within an RLC PDU 508. RLC header (H), RLC SDU segment(s), together with length indicators (LI), form RLC PDUs 508. The RLC header size can be based on the transmission mode, i.e. unacknowledged mode (UM) or acknowledged mode (AM) of the RLC transmission. Furthermore, if ciphering is enabled, ciphering may be performed on the RLC PDU except the header portion.

An RLC payload may include a segment of an RLC SDU or multiple RLC SDUs with LIs to separate RLC SDUs. RLC PDUs 508 may also contain padding to ensure that the RLC PDU is of a valid length. Each RLC PDU 508 is assigned with a sequence number by the transmitter RLC entity. This sequence number and length indicator are used in the RLC layer to recover RLC SDUs at the receiving end.

Figure 6:
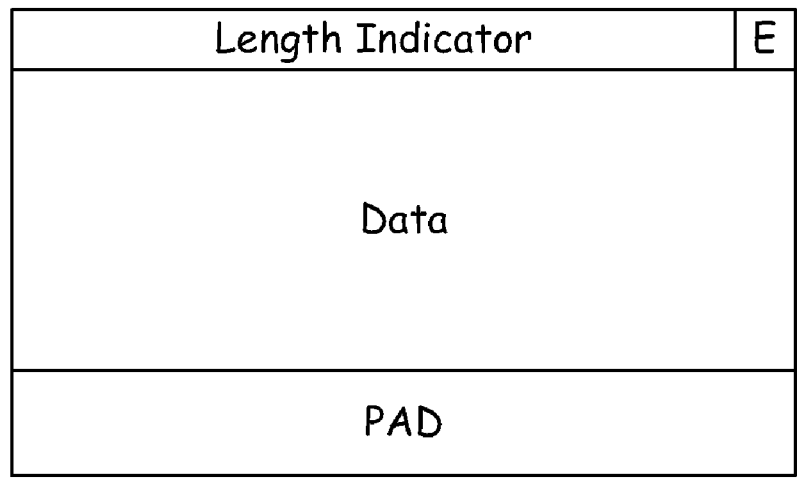
FIG. 6 provides a diagram of a ciphering unit for UM RLC PDU in accordance with embodiments of the present invention.

FIG. 6 provides a diagram of a ciphering unit for UM RLC PDU 600 in accordance with embodiments of the present invention. For the UM mode, when ciphering is enabled, the UM RLC PDU 600, except for the header, is ciphered resulting in a ciphered UM RLC PDU that can then be passed to the MAC layer 610 as MAC-d PDU 612.

Figure 7:
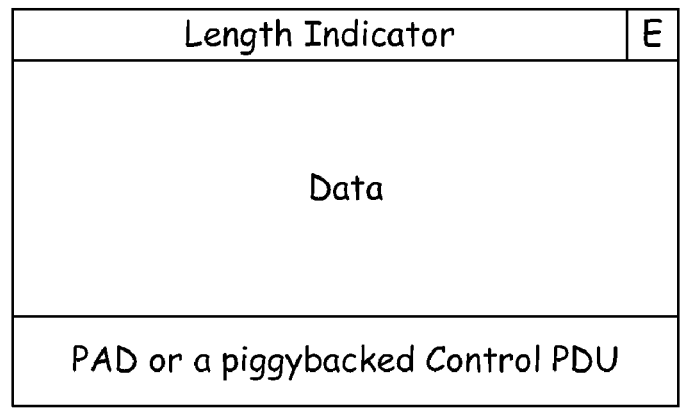
FIG. 7 provides a diagram of a ciphering unit for AM RLC PDU in accordance with embodiments of the present invention.

FIG. 7 provides a diagram of a ciphering unit for AM RLC PDU in accordance with embodiments of the present invention. For the AM, an RLC retransmission buffer is used to store the segmented or concatenated RLC SDUs together with a corresponding sequence number assigned by the RLC entity. PDUs buffered in the retransmission buffer are deleted or transmitted based on the status report found within a status PDU or piggybacked status PDU sent by the peer AM RLC entity. This status report contains positive or negative acknowledgments of individual AM RLC PDUs received by the peer AM RLC entity. The padding field of the RLC PDU can be replaced by the piggybacked status information, other control messages or padding bytes. A piggybacked STATUS PDUs or control messages can be of variable size in order to match the amount of free space in the AM RLC PDU. The ciphering (if configured) is then applied to the AM RLC PDUs (except header).

The AM RLC PDU 700 or UM RLC PDU 600 are passed to the MAC-d entity of MAC layer 510 for further processing prior to E-DCH transmission. In HS-UPA, new MAC entity MAC-e/es is introduced to handle E-DCH specifications. MAC-e/es are the MAC entities that handle the E-DCH (Enhanced Dedicated Transport Channel).

Figure 8:
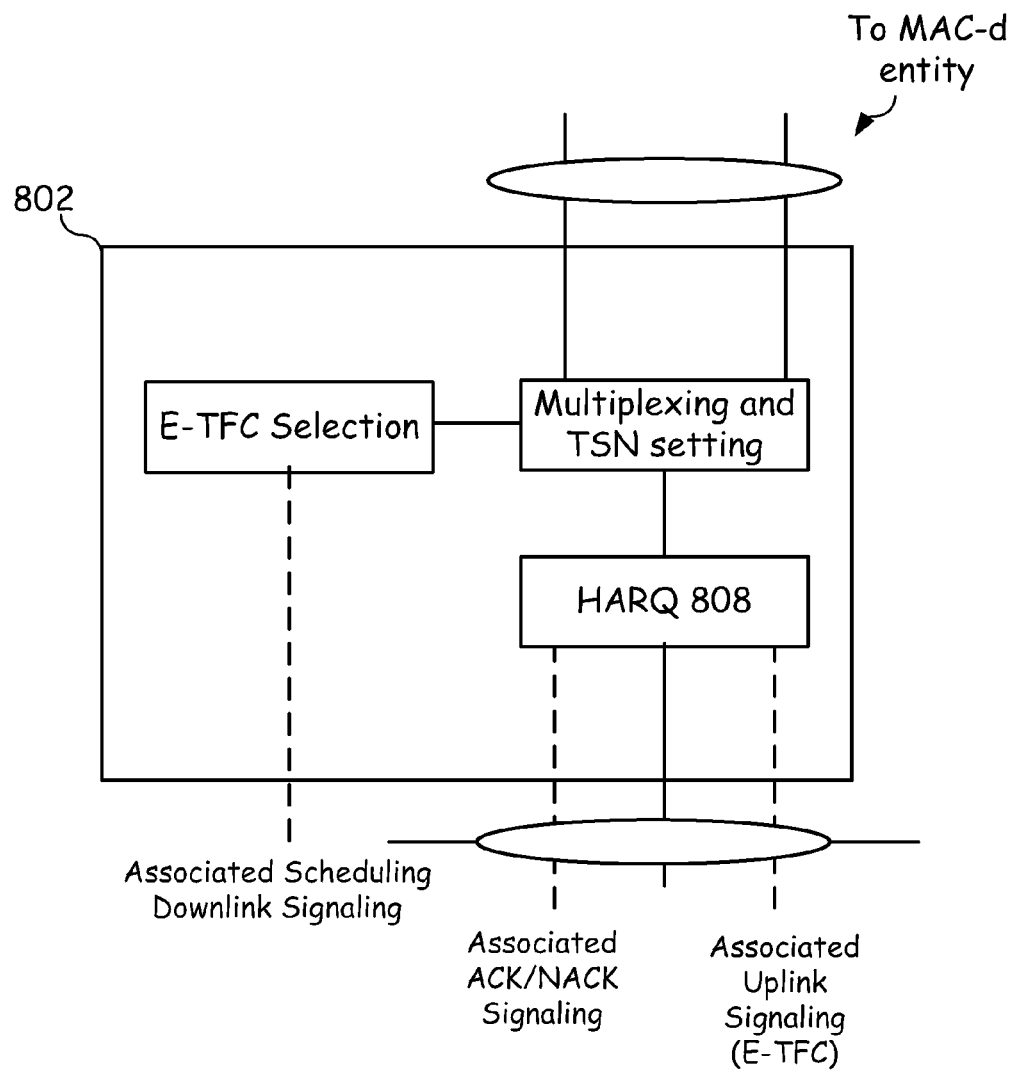
FIG. 8 illustrates the high-level MAC architecture for E-DCH used by embodiments of the present invention where the MAC-e/es is under MAC-d entity.

FIG. 8 illustrates the high-level MAC architecture for E-DCH used by embodiments of the present invention where the MAC-e/es is under MAC-d entity. The MAC-e/es entity 802 performs two-stage multiplexing function. First, MAC-e/es entity 802 accepts multiple MAC-d PDUs from the same MAC-d flow, multiplexes the MAC-d PDU, adds TSN (transmitting sequence number) as header and forms a MAC-es PDU. Second, MAC-e/es entity 802 multiplexes MAC-es PDU from different MAC-d flows, adds MAC-es header and forms a MAC-e PDU. The MAC-e PDU is then used as payload for HARQ transmission. The TSN is used for reordering purpose to support in-sequence delivery of the MAC-d PDU to RLC layer.

Figure 9:
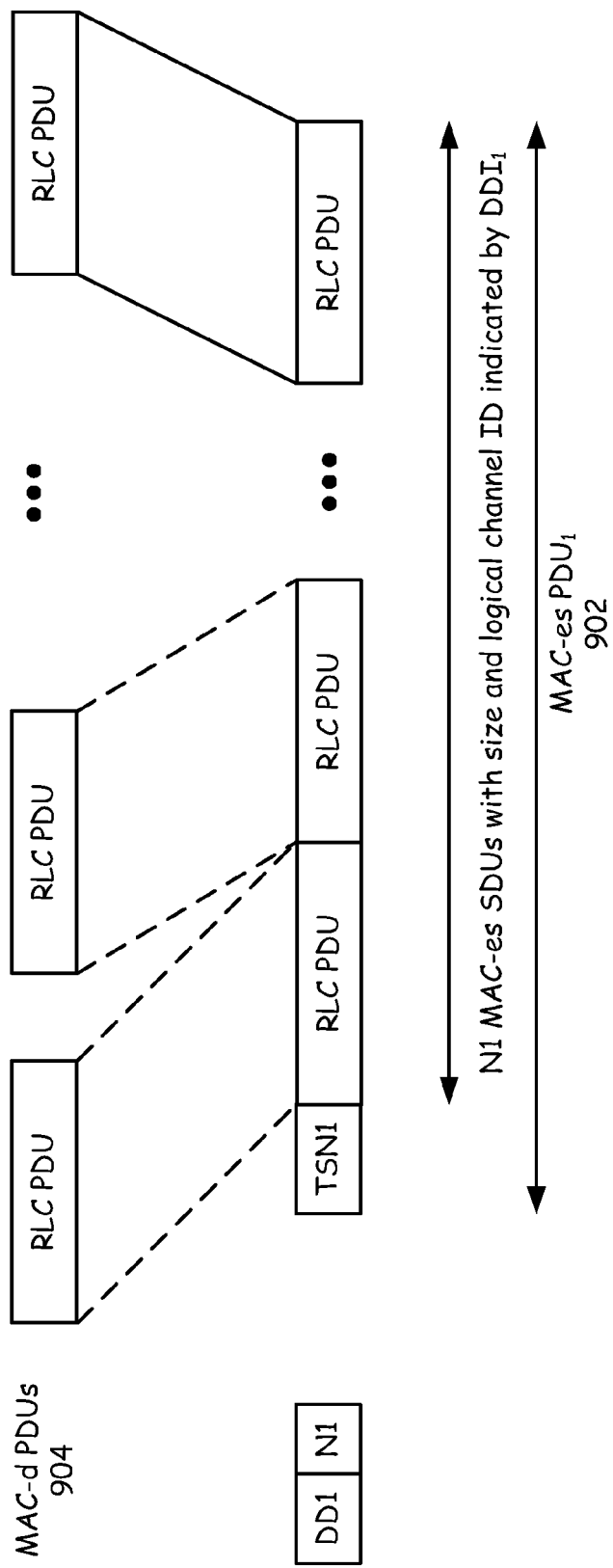
FIG. 9 illustrates the formation of the MAC-es PDU by multiplexing $N_i$, blocks of MAC-d PDUs in accordance with embodiments of the present invention.

FIG. 9 illustrates the formation of the MAC-es PDU 902 by multiplexing $N_i$ blocks of MAC-d PDUs 904. All MAC-d PDUs 904 in the MAC-es have the following features:
1. Each MAC-d PDU is the same size, where the size can be from 2 to 625 bytes. Maximum of 32 PDU sizes is available. Network provides the size list to the UE during transport channel configuration/re configuration procedure;
2. Each MAC-d PDU is from the same logical channel (i.e. same MAC-d ID); and
3. Each MAC-d PDU has a unique Data Description Indicator (DDI) which associates with the given logical channel ID, MAC-d PDU size and MAC-d flow. The mapping between DDI and the logical channel ID, PDU size and MAC-d flow is signaled by the network during transport channel configuration/reconfiguration procedure.

Figure 10:
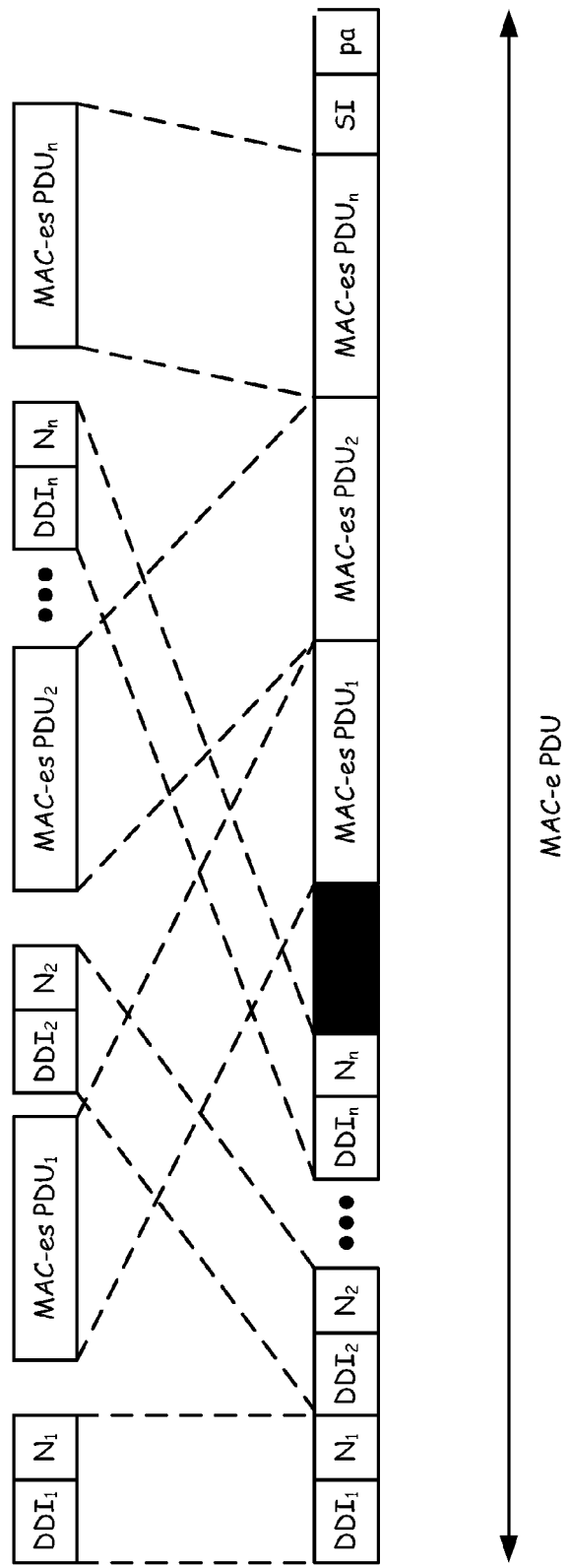
FIG. 10 illustrates the multiplexing operation of the MAC-es PDUs into a MAC-e PDU in accordance with embodiments of the present invention.

FIG. 10 shows the multiplexing operation of the MAC-es PDUs into a MAC-e PDU. In one embodiment, a maximum of 16 MAC-d flows can be multiplexed. That is, DDI can only associate with 16 different MAC-d flows. Scheduling Information (SI) is included at the end of the MAC-e PDU in case sufficient space is left in the E-DCH transport block. That is, if the size of the data plus header is less than or equal to the TB (transport block) size of the E-TFC (E-DCH Transport Format Combination) selected by the UE minus 24 bits and there is SI (18 bits) to be transmitted, then $DDI_0$ will be inserted. If the size of the data plus header is less than or equal to the TB size of the E-TFC selected by the UE minus 18 bits, then SI information is concatenated into the MAC-e PDU without insertion of $DDI_0$ at the end of the header.

Figure 11:
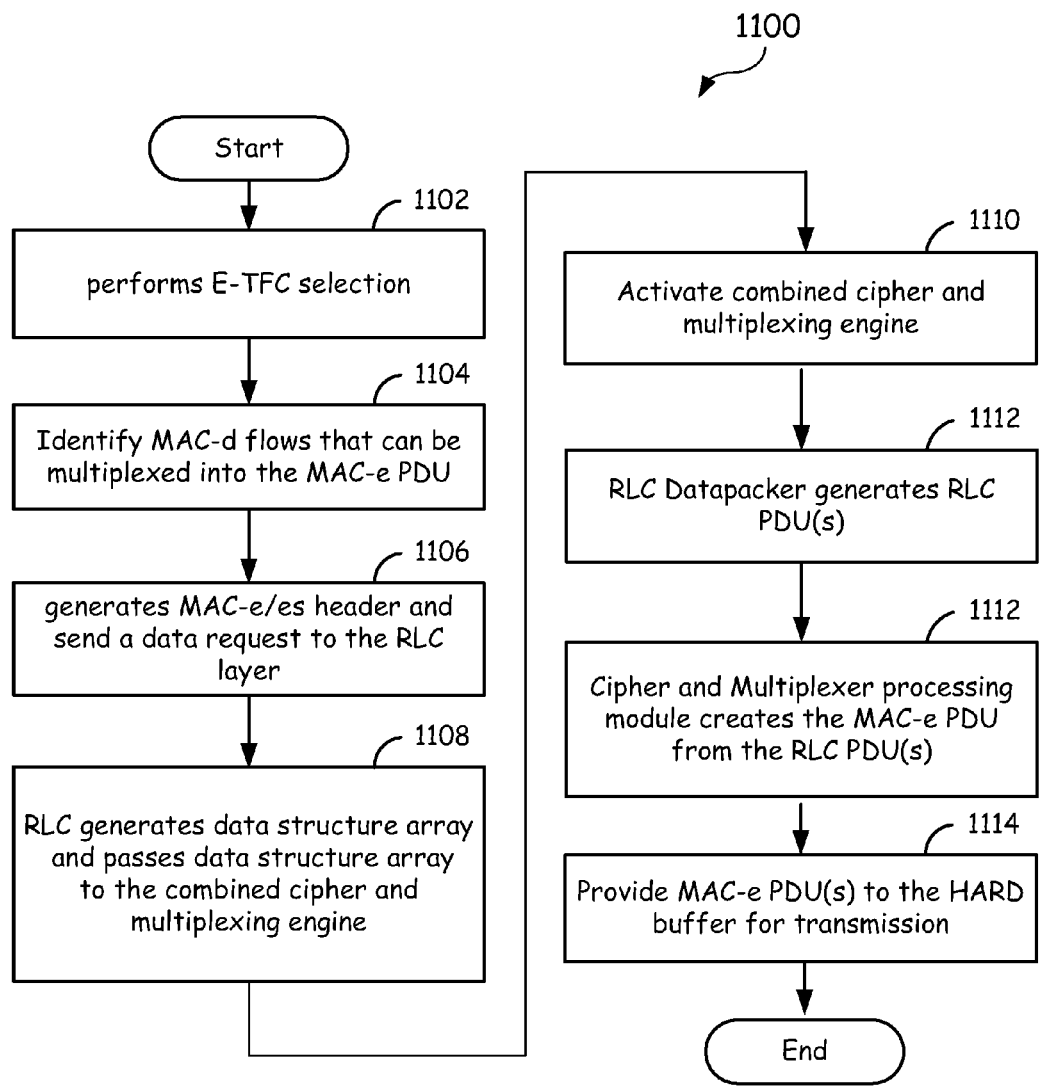
FIG. 11 shows the logic flow diagram associated with data generation for scheduled transmission in accordance with embodiments of the present invention.

FIG. 11 shows the logic flow diagram associated with data generation for scheduled transmission in accordance with embodiments of the present invention. For 2 ms TTI, the entire procedure may take less than 3.4 ms. Software performs operations 1100 when MAC layer receives data request from physical layer. First, in step 1102, the software performs E-DCH Transport Format Combination (E-TFC) selection based on the grant and HARQ ID. Next, in step 1104 using the transport format, logical channel priorities, and HARQ ID, the MAC layer further identifies logical channel/MAC-d flows that can be multiplexed into the MAC-e PDU. Then in step 1106, the MAC layer then generates MAC-e/es header and sends a data request to the RLC layer. Software will pass the starting memory address of the (DDI,N) and size of the memory to HW. HW fetches the block based on the size (odd size implies that DDI_0 is added) indicated by the software. Upon receiving the data request from MAC layer, RLC in step 1108 generates header, and calculates pointer/pointers of the new RLC PDU from RLC SDU/SDUs, retrieves data pointer from RLC re-transmission buffer (if AM mode) and passes these information to the combined cipher and multiplexing engine via a data structure array.

The combined cipher and multiplexing engine includes two hardware modules, a RLC datapacker and cipher/multiplexer processing module as illustrated in FIG. 4. In step 1110, software can either activate the two hardware modules separately or have the RLC datapacker activate the cipher/multiplexer processing module when the RLC datapacker completes its operations.

The RLC datapacker hardware module in step 1112 is responsible for moving data from RLC SDU buffers to RLC PDU buffers, performing RLC SDU segmentation when the RLC SDU size is larger than the RLC PDU size, and assembling multiple RLC SDUs into single RLC PDU in case the size of RLC SDU is smaller than that of the RLC PDU. The RLC datapacker hardware module operates based on an array that provides detailed information on the formation of the payload of the RLC_PDU prepared by the stack software. Multiple RLC PDUs can be constructed by the RLC datapacker hardware module via this array. This array contains the destination address of the RLC PDU (i.e. memory address that stores output of the datapacker); a source address of an array of data structures that describes the RLC_SDUs to be moved/packed. Additionally, the array contains the following information the address of the RLC SDU, number of bytes to be moved form the RLC SDU in the memory (a) to the RLC_PDU destination address, number of bytes in the first word of the memory listed in (a) to be skipped (offset) when forming the RLC_PDU. In necessary, this information is repeated and processed by the RLC datapacker hardware module for the next RLC SDU until the RLC datapacker hardware module reaches the last RLC SDU for the corresponding RLC PDU. The RLC datapacker hardware module will obtain the information for the next RLC PDU from the memory map and repeat these processes until it reaches the last RLC_PDU to be packed, then the RLC datapacker hardware module either sends interrupt to software/stack or activation signal to the cipher/multiplexing engine.

When the HS-UPA Cipher and Multiplexer processing module is activated by the RLC layer or datapacker module, the Cipher and Multiplexer processing module creates the MAC-e PDU from the RLC PDU(s) in step 1114. To this end, the Cipher and Multiplexer processing module packs the Data Description Indicator (DDI) information, TSN, RLC header and places the result to the proper location of the HARQ buffer based on the HARQ processor ID. If ciphering is enabled, the Cipher and Multiplexer processing module retrieves data from the RLC PDU memory, the LI memory and the SDU memory. After retrieving this data, the Cipher and Multiplexer processing module performs ciphering on the LI, RLC PDU and SDU and appends the ciphered data to the previous result. Otherwise, the Cipher and Multiplexer processing module appends the LI and RLC PDU. The Cipher and Multiplexer processing module continues these processes until the MAC-es are all generated. This may involve one or more MAC-es. When the last MAC-es is completed, the Cipher and Multiplexer processing module appends the SI at the end of the MAC-e. Upon completion, the Cipher and Multiplexer processing module sends an interrupt to the stack or Tx engine HSUPA bit level module 310B and outputs the MAC-e to the HARQ buffer for step 1114. The MAC-e data are then processed by the Tx bit level processing module 310B.

Figure 12:
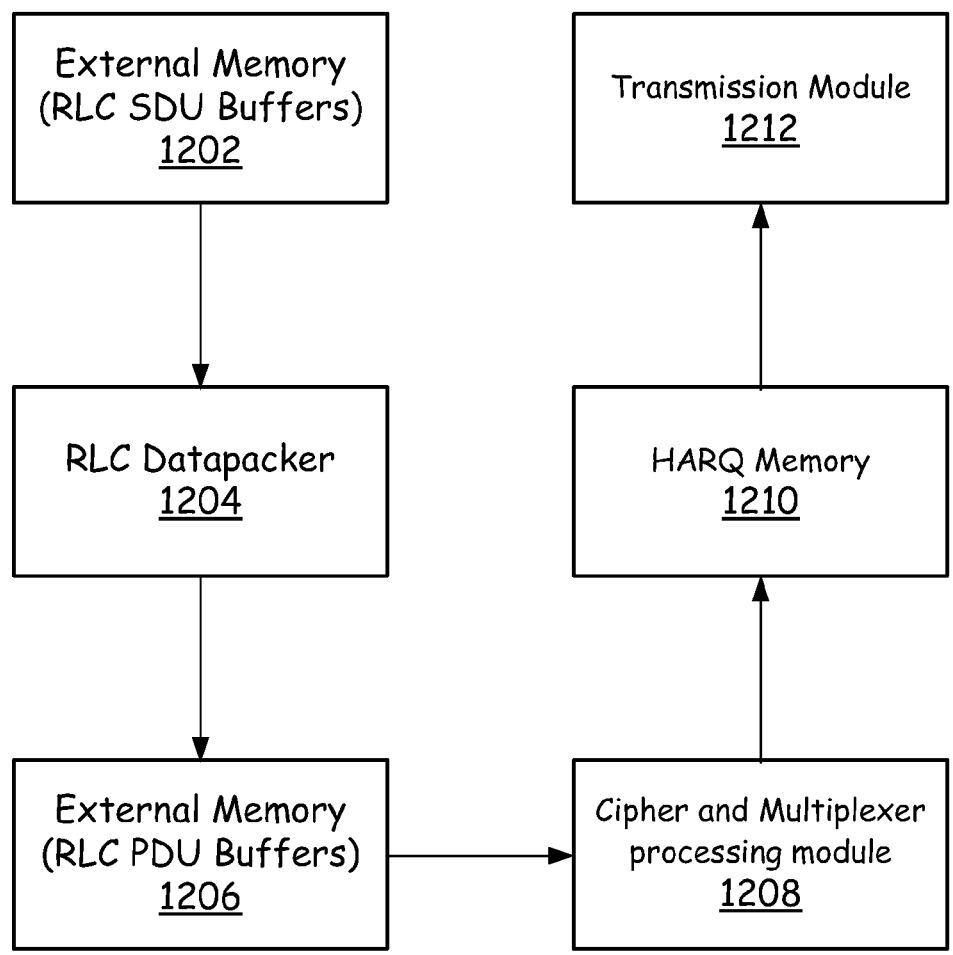
FIG. 12 indicates data exchanges between different modules in accordance with an embodiment of the present invention.

FIG. 12 indicates data exchanges between different modules in accordance within embodiment of the present invention. These different modules include external memory (RLC SDU buffers) 1202, RLC data packer 1204, external memory (RLC PDU buffers) 1206, cipher and multiplexer processing module 1208, HARQ memory 1210 and transmission module 1212. It should be noted that although modules 1202 and 1206 are shown as external memory, these may be internal memory that is part of the combined cipher and multiplexing engine provided by embodiments of the present invention. For example internal memory within this engine may be used by RLC data packer 1204 to store RLC PDUs which are then directly provided to cipher and multiplexing processing module 1208. This would eliminate the need for the RLC data packer to store RLC PDUs to an external memory via an AHB bus. And allow it to directly provide these RLC PDUs to the cipher and multiplexer processing module 1208 to meet the stringent round-trip delay requirement of the E-DCH while operates in 2 ms TTI (Transmission Time Interval).

RLC datapacker 1204 couples to external memory via an AHB bus to retrieve RLC SDUs for segmentation/concatenation. The results of this process are moved into memory 1206 (i.e. RLC PDU buffer). The cipher and multiplexer processing module 1208 also may couple to memory 1206 (i.e. RLC PDU buffer) via the AHB bus. Cipher and multiplexer processing module 1208 multiplexes MAC-d flow while outputting the cipher/packed data into HARQ buffer 1210. This buffer is accessed by the transmission module 1212 to send the MAC-e PDU as directed by the software stack via control interface register.

The software stack needs control and data structures that can be used efficiently to configure the hardware modules of the combined cipher and multiplexing engine. This may be done with several interface control registers designed to control the engines.

The baseband processor illustrated in FIGS. 2 and 3 may contain the hardware modules of the combined cipher and multiplexing engine operable to perform the operations identified above. These operations are generally called out as being performed by one of these components. However, the split of processing duties among these various components may differ without departing from the scope of the present invention.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions described above.

In summary, embodiments of the present invention provide a combined data packing, cipher and multiplexing engine operable to support high speed uplink packet access (HS-UPA) within user equipment (UE). This combined data packing, cipher multiplexing engine includes a master port, a radio link control (RLC) data packer, and a cipher multiplexing processing module. The master port couples to an advanced microprocessor bus architecture (AMBA) high speed buss (AHB) on which control information for the combined cipher and multiplexing engine is provided. The RLC couples to the master port and receives RLC service data units (SDUs) from the AHB. Then the RLC data packer may concatenate or segment RLC SDUs into RLC packet data units (PDUs) which are stored for use by a cipher multiplexing processing module. The cipher multiplexing processing module retrieves the RLC PDU from the RLC PDU buffer and ciphers to produce ciphered data, if ciphering is enabled and multiplexes the ciphered/non-ciphered data together with RLC header, MAC-e header to form a MAC-e PDU and enters the results to a hybrid automatic repeat request (HARQ) buffer. A protocol stack executed within the UE activates and provides an array on the formation of the RLC PDU, RLC header information to the combined cipher and multiplexing engine for RLC PDU ciphering and medium access control (MAC) multiplexing of the enhanced data transport channel (E-DCH).

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A combined data packing, cipher and multiplexing engine operable to support high speed uplink packet access (HS-UPA) within user equipment (UE), comprising:
    a master port coupled to an advanced microprocessor bus architecture (AMBA) high speed bus (AHB) on which control information for the combined data packing, cipher and multiplexing engine received;
    a radio link control (RLC) data packer coupled to the master port, the RLC data packer operable to:
        receive RLC service data units (SDUs) from the AHB via the master port;
        concatenate or segment RLC SDUs into RLC packet data units (PDUs); and
        store RLC PDUs to a RLC PDU buffer; and
    a cipher/multiplexing processing module operable to:
        retrieve the RLC PDU from the RLC PDU buffer;
        cipher the RLC PDU to produce ciphered data, when cipher enabled; and
        enter the ciphered data to a Hybrid Automatic Repeat reQuest (HARQ) buffer; and
    wherein a protocol stack executed within the UE activates and provides an array on the formation of the RLC PDU, RLC header information to the combined data packing, cipher and multiplexing engine for RLC PDU ciphering and Medium Access Control (MAC) multiplexing of an enhanced dedicated transport channel (E-DCH).

2. The combined data packing, cipher and multiplexing engine of claim 1, wherein:
    RLC PDU's are stored within a retransmission buffer; and
    deleted or retransmitted based on a status report sent from a peer RLC entity.

3. The combined data packing, cipher and multiplexing engine of claim 1, wherein each RLC PDU comprises:
    a destination address of the RLC PDU (i.e. memory address that stores output of the datapacker; and
    a source address of an array of data structure that describes the RLC SDUs to be packed.

4. The combined cipher and multiplexing engine of claim 1, wherein the HARQ buffer is operable to store multiple transport blocks for multiple HARQ processor and provide resynchronization to a transmit engine.

5. The combined data packing, cipher and multiplexing engine of claim 1, wherein the RLC datapacker outputs the RLC PDUs to a system memory available through the AHB.

6. The combined data packing, cipher and multiplexing engine of claim 1, wherein the RLC datapacker outputs the RLC PDUs directly to the internal memory of the cipher/multiplexing processing module.

7. The combined data packing, cipher and multiplexing engine of claim 1, wherein RLC PDUs are processed by a medium access control (MAC) layer to produce transport blocks for E-DCH transmission.

8. A method operable produce transport blocks for enhanced dedicated channel (E-DCH) transmission within high speed uplink packet access (HS-UPA) capable user equipment (UE), comprising:
  generating an array directed to a formation of a radio link control (RLC) header, RLC packet data units (PDUs), and medium access control (MAC)-e/es multiplexing, wherein the array is generated by a protocol stack within the UE;
  providing the array to a combined data packing, cipher and multiplexing engine, the combined data packing, cipher and multiplexing engine comprising:
    a RLC datapacker; and
    a cipher/multiplexing processing module;
  generating, with the RLC datapacker, RLC PDUs from RLC service data units (SDUs) based on the array;
  activating the cipher/multiplexing processing module;
  ciphering with the cipher/multiplexing processing module, when directed by the array, the RLC PDUs;
  producing, with the cipher/multiplexing processing module, MAC-d PDUs from the RLC PDUs;
  multiplexing, with the cipher/multiplexing processing module, MAC-d PDUs from a MAC-d flow to produce a MAC-es PDUs;
  multiplexing, with the cipher/multiplexing processing module, MAC-es PDUs from diverse MAC-d flows to produce a MAC-e PDUs; and
  producing transport blocks for enhanced dedicated transport channel (E-DCH) transmission from the MAC-e PDUs.

9. The combined data packing, cipher and multiplexing engine of claim 8, wherein the MAC layer is operable to:
  perform a first stage multiplexing operation to produce a MAC-es PDU, the first stage multiplexing operation comprising:
    accepting multiple MAC-d PDUs from a MAC-d flow;
    multiplex the MAC-d PDUs; and
    add a header comprising a transmit sequence number; and
  perform a second stage multiplexing operation to produce a MAC-e PDU, the second stage multiplexing operation comprising:
    accepting multiple MAC-es PDUs from different MAC-d flow;
    multiplex the MAC-es PDUs; and
    add a MAC-es header.

10. The method of claim 8, wherein the multiplexing MAC-d PDUs from a MAC-d flow to produce a MAC-es PDUs comprises:
  accepting multiple MAC-d PDUs from a single MAC-d flow;
  multiplexing the MAC-d PDUs; and
  adding a header comprising a transmit sequence number.

11. The method of claim 8, wherein the multiplexing MAC-es PDUs from diverse MAC-d flows to produce a MAC-e PDUs comprises:
  accepting multiple MAC-es PDUs from different MAC-d flow;
  multiplexing the MAC-es PDUs; and
  adding a MAC-es header.

12. The method of claim 8, wherein the combined data packing, cipher and multiplexing engine couples to an advanced microprocessor bus architecture (AMBA) high speed bus (AHB) from which control information for the combined cipher and multiplexing engine and RLC SDUs are received.

13. The method of claim 8, further comprising:
  entering the ciphered RLC PDUs to a Hybrid Automatic Repeat reQuest (HARQ) buffer.

14. The method of claim 8, wherein the RLC datapacker:
  concatenates or segments RLC SDUs into RLC PDUs; and
  store RLC PDUs to a RLC PDU buffer.

15. The method of claim 8, wherein the RLC datapacker activates the cipher/multiplexing processing module after producing the RLC PDUs.

16. The method of claim 8, wherein each RLC PDU comprises:
  a destination address of the RLC PDU (i.e. memory address that stores output of the datapacker; and
  a source address of an array of data structure that describes the RLC SDUs to be packed.

17. The method of claim 8, wherein the RLC datapacker outputs the RLC PDUs to a system memory available through the AHB.

18. The method of claim 8, wherein the RLC datapacker outputs the RLC PDUs directly to the cipher/multiplexing processing module.

19. The method of claim 8, wherein the MAC layer is operable to:
  perform the multiplexing operation to produce a MAC-es PDU; and
  perform the multiplexing operation to produce a MAC-e PDU.

20. The method of claim 8, wherein the UE operates according to the $3^{rd}$ Generation Partnership Agreement (3GPP).

21. A method operable produce transport blocks for enhanced dedicated channel (E-DCH) transmission within high speed uplink packet access (HS-UPA) capable user equipment (UE), comprising:
  generating an array directed to a formation of a radio link control (RLC) header, RLC packet data units (PDUs), and medium access control (MAC)-e/es multiplexing, wherein the array is generated by a protocol stack within the UE;
  providing the array to a combined data packing, cipher and multiplexing engine, the combined data packing, cipher and multiplexing engine comprising:
    a RLC datapacker; and
    a cipher/multiplexing processing module;
  generating, with the RLC datapacker, RLC PDUs from RLC service data units (SDUs) based on the array;
  activating the cipher/multiplexing processing module;
  ciphering with the cipher/multiplexing processing module, when cipher enabled, the RLC PDUs;
  producing, with the cipher/multiplexing processing module, MAC-d PDUs from the RLC PDUs, wherein the RLC PDUs comprise ciphered RLC PDUs and non-ciphered RLC PDUs;
  multiplexing, with the cipher/multiplexing processing module, MAC-d PDUs from a MAC-d flow to produce a MAC-es PDUs;

multiplexing, with the cipher/multiplexing processing module, MAC-es PDUs from diverse MAC-d flows to produce a MAC-e PDUs; and producing transport blocks for enhanced dedicated transport channel (E-DCH) transmission from the MAC-e PDUs.

22. The method of claim 21, wherein the cipher/multiplexing processing module is performs data moving and/or copier functions when not cipher enabled.

* * * * *

UNITED STATES PATENT AND TRADEMARK OFFICE
CERTIFICATE OF CORRECTION

| | | |
|---|---|---|
| PATENT NO. | : 7,949,012 B2 | |
| APPLICATION NO. | : 11/861700 | |
| DATED | : May 24, 2011 | |
| INVENTOR(S) | : Li Fung Chang et al. | |

It is certified that error appears in the above-identified patent and that said Letters Patent is hereby corrected as shown below:

Col. 16, line 42, in claim 21: after "A method operable" insert --to--
Col. 18, line 2, in claim 22: after "processing module" delete "is"

Signed and Sealed this
Eighteenth Day of December, 2012

David J. Kappos
*Director of the United States Patent and Trademark Office*